E. C. BROWN.
WHEEL-PLOW.
No. 175,921.   Patented April 11, 1876.
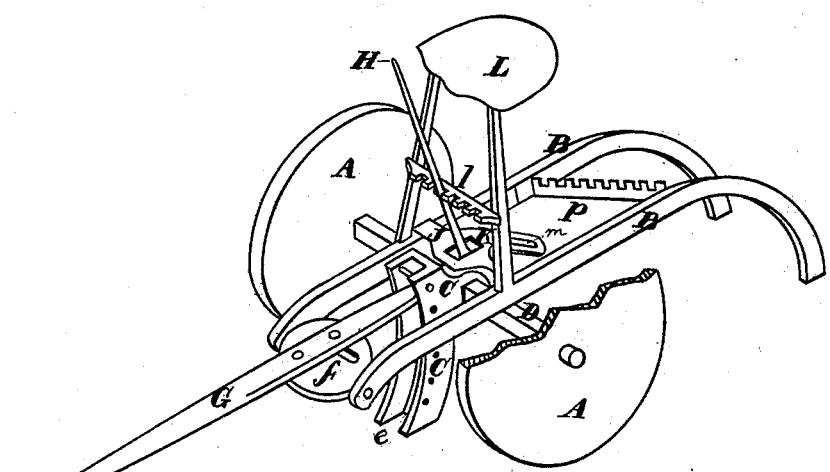
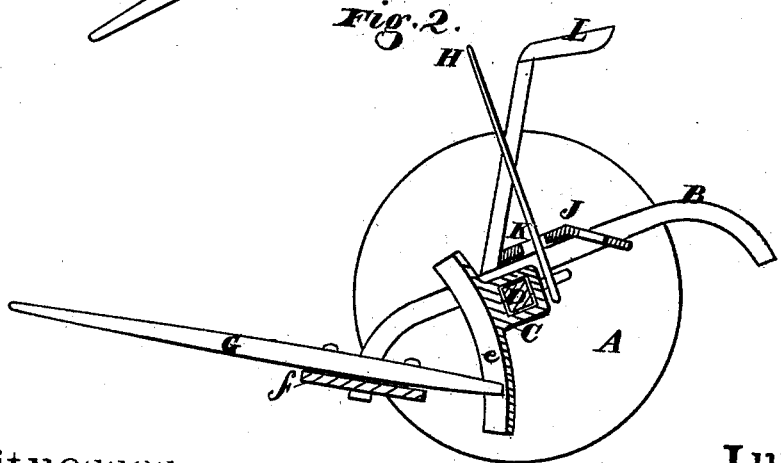
Witnesses  
Geo. H. Strong.  
Jno. L. Boone
Inventor:  
Edmund C. Brown  
by Dewey & Co  
Attys

UNITED STATES PATENT OFFICE.

EDMUND C. BROWN, OF ANTELOPE, CALIFORNIA.

IMPROVEMENT IN WHEEL-PLOWS.

Specification forming part of Letters Patent No. 175,921, dated April 11, 1876; application filed August 23, 1875.

*To all whom it may concern:*

Be it known that I, E. C. BROWN, of Antelope, Yolo county, State of California, have invented a Land-Gage for Plows; and I do hereby declare the following description and accompanying drawings are sufficient to enable any person skilled in the art or science to which it most nearly appertains to make and use my said invention, without further invention or experiment.

My invention relates to what I call a lever-gage, by which I am able to change the line of draft so as to give the plow more or less land, as required, without stopping the plows.

It is seldom that a piece of land of any great extent possesses a surface-soil of uniform character. Some places are harder and less easily penetrated by the plow than others, especially where the land is uneven, so that a plow that is set to turn a furrow of a stated width will, at times, almost stall the team, while at other places it will run easily.

The object of my improvement is to place in the hands of the plowman, whether he is operating a sulky-plow or a common handle-plow, a means of regulating the width of the land which the plow turns without having to stop the team, thus regulating the draft upon the team without varying the depth of the furrow.

In order to represent my improvement as adapted to both a sulky-plow and a handle-plow, I have represented the rear ends of the two beams of a sulky-plow bent downward in the form of handles, as will be more fully shown by reference to the drawings, in which—

Figure 1 is a perspective view. Fig. 2 is a section.

Let A A represent the bearing-wheels, and B B the beams of a gang-plow. There is already in use a style of plow in which a casting, C, is secured to the axle D, and the front face of this casting is curved in a vertical line, so as to form a sort of shoe, and a groove, e, is made in its front face, which extends its entire length. This style of plow has also a plate, f, secured between the forward ends of the plow-beams by means of journals, which bear on the ends of the beams, so that the plate can turn on the journals. The pole G is secured to this plate f, so that its rear end will move in the groove in the face of the casting, the plate allowing the forward end of the pole to raise and lower, while the rear end moves in the groove in which it can be fixed at any desired point by a pin.

My invention consists in placing this casting C loosely upon the axle, and applying a lever, H, by means of which the driver can move the casting and shift the direction of the pole, so as to land his plows as desired without stopping the team or leaving his seat.

I is the seat, and the lever extends upward far enough to be within convenient reach of the driver. Just above the casting C I secure a plate, J, in which is a hole, k, and the lever passes through this hole, which serves as a fulcrum. A horizontal rack, l, on the seat-frame, serves to retain the lever wherever it may be shifted. I thus greatly improve this class of plows, as the driver can, by shifting the lever to the right or left, change the landing of the plow without trouble.

When I use this device on a single or handle plow the casting C will be placed upon a rod which connects the lower ends of the handle-bars, and the lever will extend directly to the rear between the two handles, passing through a hole in the plate J, as above. In this case a rack, p, will be secured between the handles, so as to retain the lever in place in whatever position it may be placed.

Having thus described my invention, what I claim, and desire to secure by Letters Patent, is—

In combination with a plow, having the pole G secured to a journaled plate, f, and its rear end engaging with a sliding casting, C, the lever H and plate J, with its holes k and m and the horizontal racks l and P, substantially as and for the purpose described.

EDMUND C. BROWN.

Witnesses:
H. M. HOYT,
J. WAVERLEY ANDERSON.